US012429799B2

(12) United States Patent
Yoshioka et al.

(10) Patent No.: US 12,429,799 B2
(45) Date of Patent: Sep. 30, 2025

(54) TONER CARTRIDGE AND IMAGE FORMING APPARATUS

(71) Applicant: KYOCERA Document Solutions Inc., Osaka (JP)

(72) Inventors: Kazuki Yoshioka, Osaka (JP); Rei Yamagishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/791,892

(22) Filed: Aug. 1, 2024

(65) Prior Publication Data

US 2025/0053118 A1 Feb. 13, 2025

(30) Foreign Application Priority Data

Aug. 8, 2023 (JP) ................................ 2023-129247

(51) Int. Cl.
*G03G 15/08* (2006.01)
*G03G 21/16* (2006.01)

(52) U.S. Cl.
CPC ..... *G03G 15/0886* (2013.01); *G03G 15/0872* (2013.01); *G03G 15/0891* (2013.01); *G03G 21/1647* (2013.01)

(58) Field of Classification Search
CPC ........... G03G 15/0872; G03G 15/0886; G03G 15/0891; G03G 21/1647; G03G 21/1821
USPC .................................. 399/106, 107, 110, 111
See application file for complete search history.

(56) References Cited

U.S. PATENT DOCUMENTS 11,567,428 B2 * 1/2023 Sato .................. G03G 21/1821

FOREIGN PATENT DOCUMENTS

JP 2013003525 * 1/2013
JP 2020-091326 A 6/2020

* cited by examiner

*Primary Examiner* — Hoan H Tran
(74) *Attorney, Agent, or Firm* — Stein IP, LLC

(57) ABSTRACT

An image forming apparatus includes a toner cartridge that supplies toner to an image carrier. The toner cartridge includes a development unit that is connected to a toner container via a connection hole, and has an external opening for supplying the toner to the image carrier, an outer shutter that opens and closes the external opening, an inner shutter that opens and closes the connection hole, and a gear mechanism that connects the outer shutter and the inner shutter to be capable of interlocking with each other. When outer shutter is in a first closing position to close the external opening, the inner shutter is in a second closing position to close the connection hole. When the outer shutter is in a first opening position to open the external opening, the inner shutter is in a second opening position to open the connection hole.

9 Claims, 13 Drawing Sheets

TONER CARTRIDGE AND IMAGE FORMING APPARATUS

INCORPORATION BY REFERENCE

This application is based upon and claims the benefit of priority from the corresponding Japanese Patent Application No. 2023-129247 filed Aug. 8, 2023, the entire contents of which are hereby incorporated by reference.

BACKGROUND

The present disclosure relates to a toner cartridge and an image forming apparatus using the toner cartridge.

In an electrophotographic type image forming apparatus such as a laser printer, when toner is decreased, the toner cartridge is replaced so as to replenish the toner. During replacement of the toner cartridge, the toner may leak. Therefore, a means for preventing leakage of the toner is proposed.

JP-A-2020-91326 discloses a structure in which a sealing member is attached, which covers and seals an opening of a development frame body of a development unit in which the toner is stored.

In the structure described in JP-A-2020-91326, the development unit is attached to a process cartridge, and along with operation of a toner conveyance unit, the sealing member is removed, and the opening opens. After that, the sealing member moves in a toner storage chamber and is used as a toner stirring member. Therefore, if the development unit is detached from the process cartridge in a state where the toner is remained, the toner may leak through the opening. In this case, the leakage of the toner can be prevented by attaching a cover, but it is necessary to prepare the additional cover.

SUMMARY

A toner cartridge according to the present disclosure supplies toner to an electrostatic latent image formed on an image carrier, so as to develop the same into a toner image. It includes a toner container configured to store the toner, a development unit connected to the toner container via a connection hole, the development unit having an external opening on its outer periphery surface so as to supply the toner to the image carrier, a toner carrier disposed in the development unit in a rotatable manner, so as to face the image carrier, the toner carrier carrying the toner, an outer shutter configured to open and close the external opening, an inner shutter configured to open and close the connection hole, and a gear mechanism configured to connect the outer shutter and the inner shutter to be capable of interlocking with each other. The outer shutter is movable at least between a first closing position to close the external opening and a first opening position to open the external opening. The inner shutter is movable at least between a second closing position to close the connection hole and a second opening position to open the connection hole. When the outer shutter is in the first closing position, the inner shutter is in the second closing position, while when the outer shutter is in the first opening position, the inner shutter is in the second opening position.

Other features and advantages of the present disclosure will become more apparent from the description of the embodiment given below.

DETAILED DESCRIPTION

Figure 1:
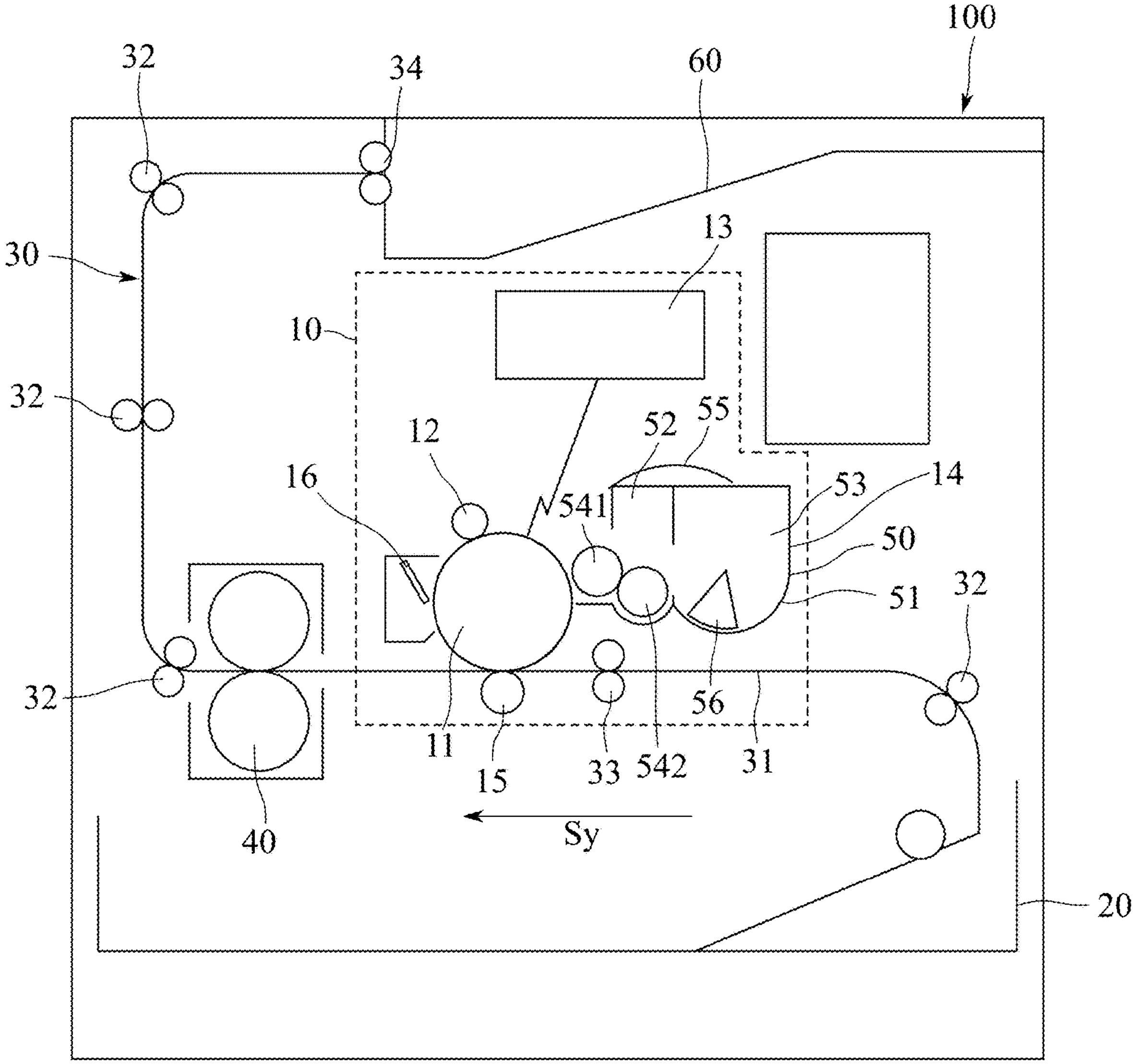
FIG. 1 is a cross-sectional side view illustrating an internal structure of an image forming apparatus.
Figure 2:
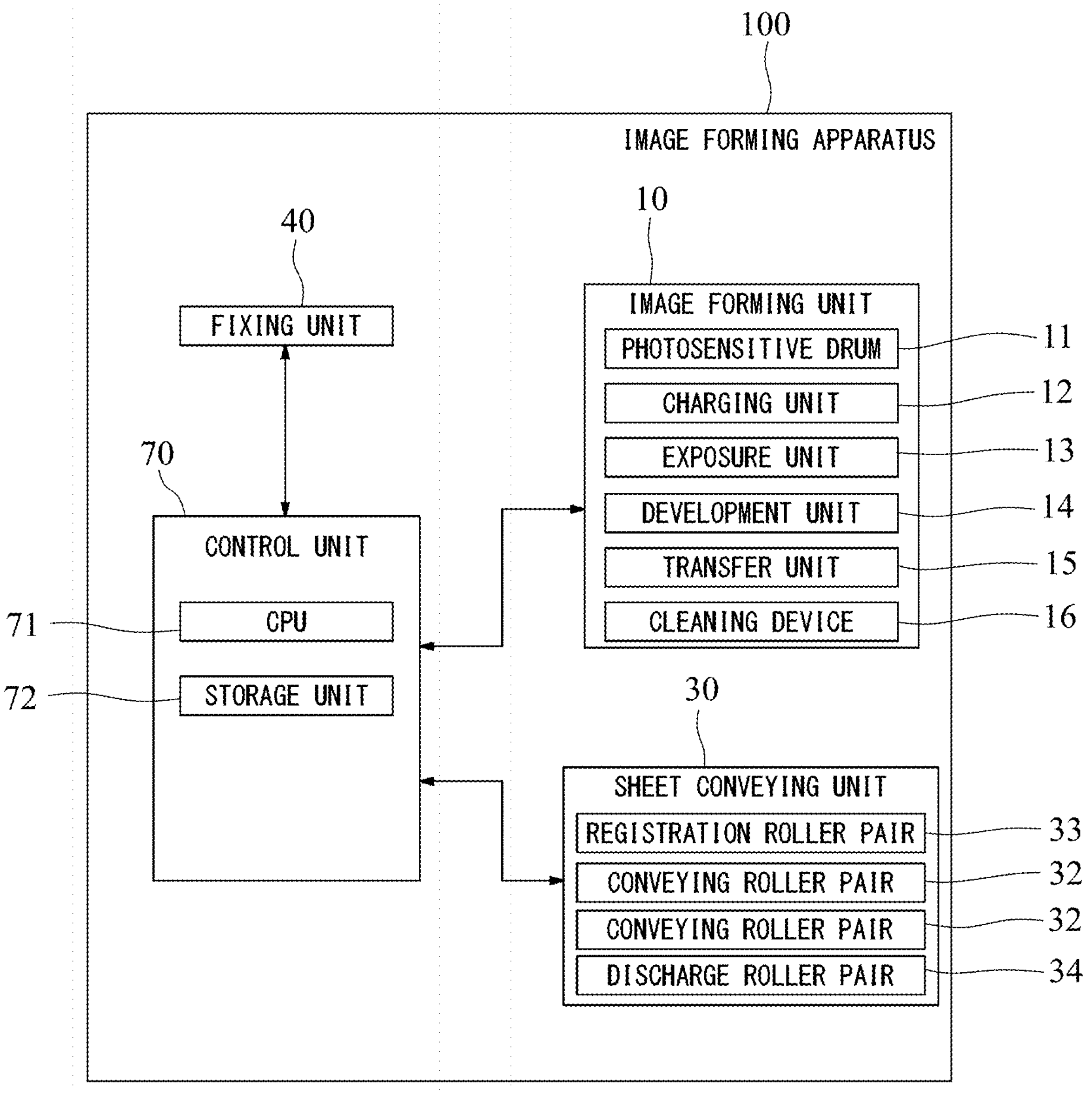
FIG. 2 is a functional block diagram of the image forming apparatus.

Hereinafter, with reference to the drawings, an embodiment of the present disclosure is described. FIG. 1 is a cross-sectional side view illustrating an internal structure of an image forming apparatus 100. FIG. 2 is a functional block diagram of the image forming apparatus 100. In the following description, a direction perpendicular to a conveying direction of a paper sheet may be referred to as a scanning direction Sx, and a direction along the conveying direction of the paper sheet may be referred to as a sub-scanning direction Sy.

As illustrated in FIG. 1, the image forming apparatus (e.g., a monochrome printer) 100 includes an image forming unit 10, a sheet cassette 20, a sheet conveying unit 30, a fixing unit 40, a sheet stacking unit 60, and a control unit 70. In the image forming apparatus 100, a sheet in the sheet cassette 20 is conveyed along the sheet conveying unit 30, to the image forming unit 10 and the fixing unit 40 sequentially, and is discharged onto the sheet stacking unit 60. When the sheet passes through the image forming unit 10 and the fixing unit 40, an image is formed on the same. Details of each unit are described below.

(Control Unit 70)

The control unit 70 controls each unit of the image forming apparatus 100. As illustrated in FIG. 2, the control unit 70 is connected to the image forming unit 10, the sheet conveying unit 30, and the fixing unit 40. Further, the control unit 70 controls operations of these units and acquires information from each unit. The control unit 70 includes a CPU 71. In addition, the control unit 70 includes a storage unit 72 including a nonvolatile memory such as a read only memory (ROM) or a flash ROM, and a volatile memory such as a random access memory (RAM). The storage unit 72 stores programs and data related to the control. The control unit 70 controls each unit using the program and data stored in the storage unit 72.

(Image Forming Unit 10)

Figure 12:
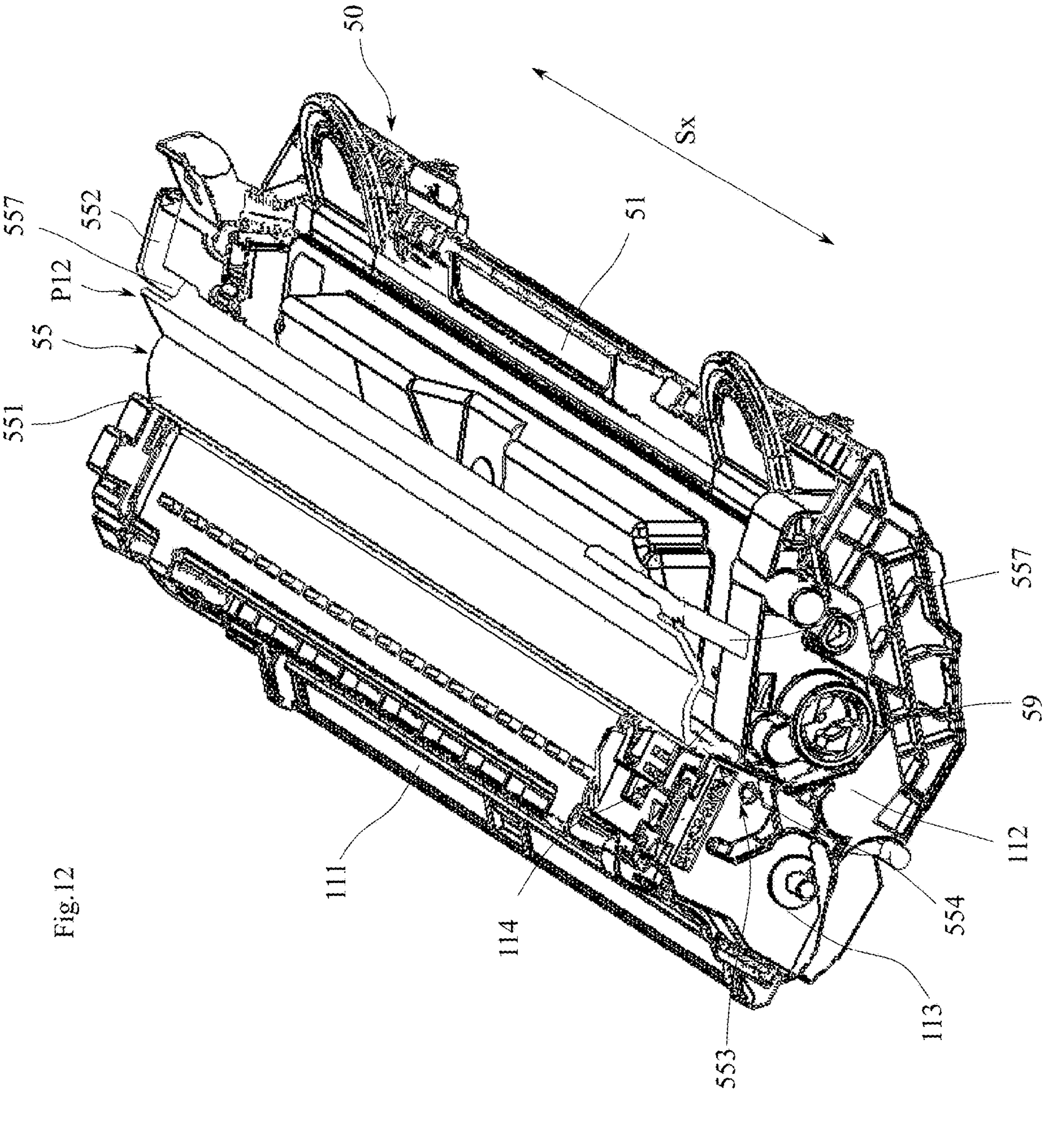
FIG. 12 is a perspective view illustrating the toner cartridge in a state attached to the drum cartridge.
Figure 13:
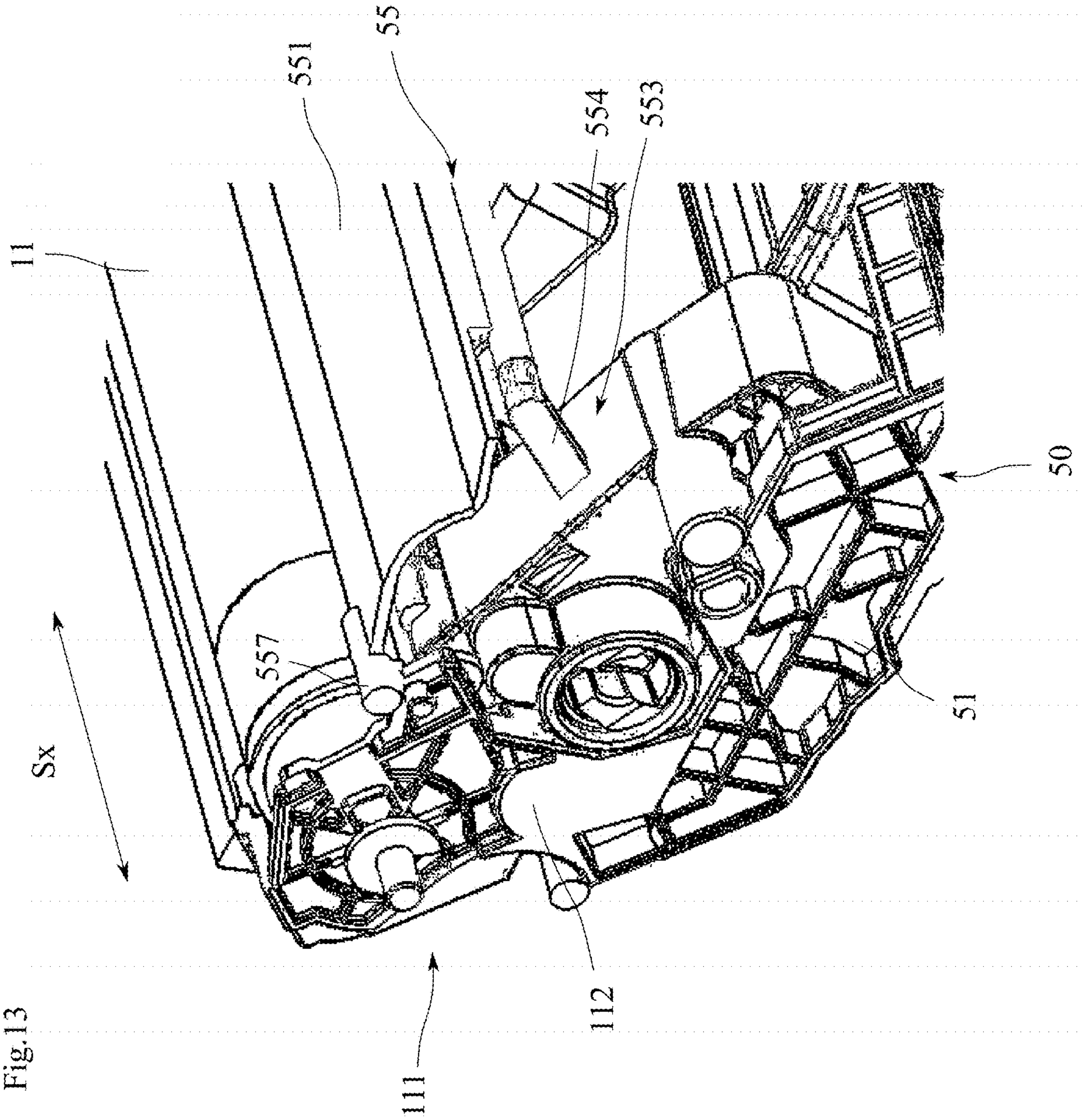
FIG. 13 is an enlarged perspective view of the opening and closing boss and its vicinity of the outer shutter of the toner cartridge.

The image forming unit 10 forms a monochrome image in this embodiment. The image forming unit 10 includes a photosensitive drum 11 as an image carrier. As illustrated in FIGS. 12 and 13 that will be referred to later, in the image forming apparatus 100, the photosensitive drum 11 is supported in a rotatable manner by a drum cartridge 111. The drum cartridge 111 can be attached and detached from the image forming apparatus 100.

In addition, in the image forming unit 10, along a rotation direction of the photosensitive drum 11 (a clockwise direction in FIG. 1), there are disposed a charging unit 12, an exposure unit (a laser scanning unit and the like) 13, a development unit 14, a transfer roller 15, a cleaning device 16, and a charge elimination device (not shown). An operation of each unit of the image forming unit 10 is controlled by the control unit 70.

A case where the image forming unit 10 performs image formation is described. The rotating photosensitive drum 11 is uniformly charged by the charging unit 12. Then, the exposure unit 13 forms an electrostatic latent image on a surface of the photosensitive drum 11 on the basis of an original image data. Further, the development unit 14 allows toner to adhere to the electrostatic latent image, so as to form a toner image on the surface of the photosensitive drum 11. The development unit 14 is constituted of a toner cartridge 50.

The sheet conveying unit 30 conveys the sheet from the sheet cassette 20 to the photosensitive drum 11 on which the toner image is formed. When the sheet passes through the image forming unit 10, the toner image formed on the surface of the photosensitive drum 11 is transferred onto the sheet by the transfer roller 15 (an image transfer unit). The sheet with the transferred toner image is separated from the photosensitive drum 11 and is conveyed to the fixing unit 40. The fixing unit 40 fixes the toner image to the sheet.

In addition, some toner may remain on the surface of the photosensitive drum 11 after the transfer of the toner image. The residual toner on the surface of the photosensitive drum 11 is removed by the cleaning device 16 disposed on a downstream side of the transfer roller 15. Then, after the residual toner on the surface is removed, residual charge on the surface of the photosensitive drum 11 is eliminated by a charge elimination device (not shown) disposed on the downstream side of the cleaning device 16.

(Fixing Unit 40)

The fixing unit 40 allows the toner image transferred onto the sheet to be fixed to the sheet. The fixing unit 40 includes a roller pair. When the sheet passes through a nip part of the roller pair, the sheet is heated and pressed, so that the toner image is fixed to the sheet. Note that in order to fix the toner image, it is necessary to heat up to a certain temperature or higher. Therefore, one of the pair of rollers of the fixing unit 40 is provided with a heater (not shown) for heating the sheet.

(Sheet Cassette 20 and Sheet Conveying Unit 30)

The sheet cassette 20 stores sheets before image formation. The sheet cassette 20 can be attached and detached from the image forming apparatus 100. The sheets stored in the sheet cassette 20 are sent out one by one to the sheet conveying unit 30.

The sheet conveying unit 30 includes a sheet conveying path 31, a plurality of conveying roller pairs 32, a registration roller pair 33, and a discharge roller pair 34.

The sheet conveying path 31 guides the sheet sent out from the sheet cassette 20 to the image forming unit 10 and the fixing unit 40. In addition, the sheet conveying path 31 guides the sheet after fixing in the fixing unit 40 to the sheet stacking unit 60. The plurality of conveying roller pairs 32 are arranged along the sheet conveying path 31. The sheet sent out from the sheet cassette 20 is conveyed along the sheet conveying path 31 by operation of the conveying roller pairs 32. Then, the sheet conveyed along the sheet conveying path 31 is conveyed to the image forming unit 10 via the registration roller pair 33.

In addition, the sheet conveying unit 30 drives the conveying roller pair 32 to rotate in the same manner, so as to convey the sheet after toner image formation in the image forming unit 10 to the fixing unit 40. Then, the sheet after the toner image is fixed in the fixing unit 40 is also conveyed along the sheet conveying path 31 by operation of the plurality of conveying roller pairs 32, and is discharged by the discharge roller pair 34 onto a sheet stacking unit 60 disposed on an upper part of the image forming apparatus 100.

Note that this embodiment describes the structure including motors to drive individual rollers, but it may be possible that a single motor drives a plurality of rollers. In this case, a common motor may drive one group of rollers rotating synchronously. In addition, using a power transmission mechanism that can change rotation speed and rotation direction, a common motor may drive a plurality of rollers rotating asynchronously.

The sheet conveying path 31 guides the sheet sent out from the sheet cassette 20 to the image forming unit 10. The registration roller pair 33 is disposed in the sheet conveying path 31. The sheet sent out from the sheet cassette 20 is sent to the image forming unit 10 via the sheet conveying path 31 and the registration roller pair 33.

The sheet conveying unit 30 guides the sheet with the toner image formed in the image forming unit 10 to the fixing unit 40. In addition, the sheet conveying path 31 conveys the sheet with the toner image fixed in the fixing unit 40 to the sheet stacking unit 60. The conveying roller pair 32 and the discharge roller pair 34 are disposed in the sheet conveying path 31.

The sheet after passing through the fixing unit 40 is conveyed by the conveying roller pair 32. The sheet after passing through the conveying roller pair 32 is conveyed along the sheet conveying path 31 to the upper part of the image forming apparatus 100. The printed sheet is discharged onto the sheet stacking unit 60 via the conveying roller pair 32 and the discharge roller pair 34.

The image forming apparatus 100 has the structure described above. In the image forming apparatus 100, as the image formation on the sheets proceeds, the toner is decreased. Further, in the image forming apparatus 100, the toner cartridge 50 as a developing container is mounted to the development unit 14 in an attachable and detachable manner, so as to have a structure in which the toner cartridge 50 is replaced for replenishment of the toner. Here, details of the toner cartridge 50 are described with reference to the drawings.

(Toner Cartridge 50)

Figure 3:
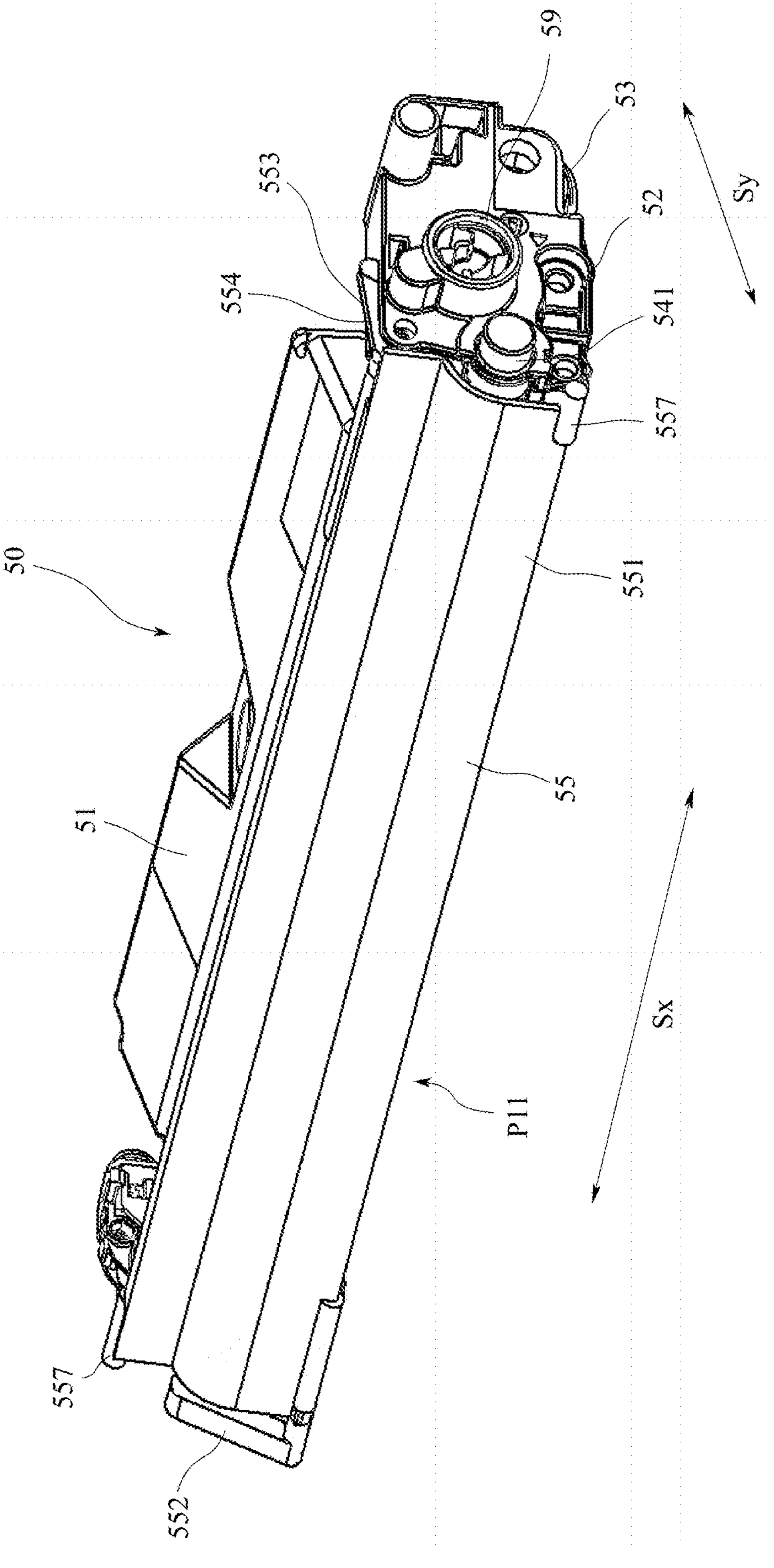
FIG. 3 is a perspective view of a toner cartridge in a state where its outer shutter is closed.
Figure 4:
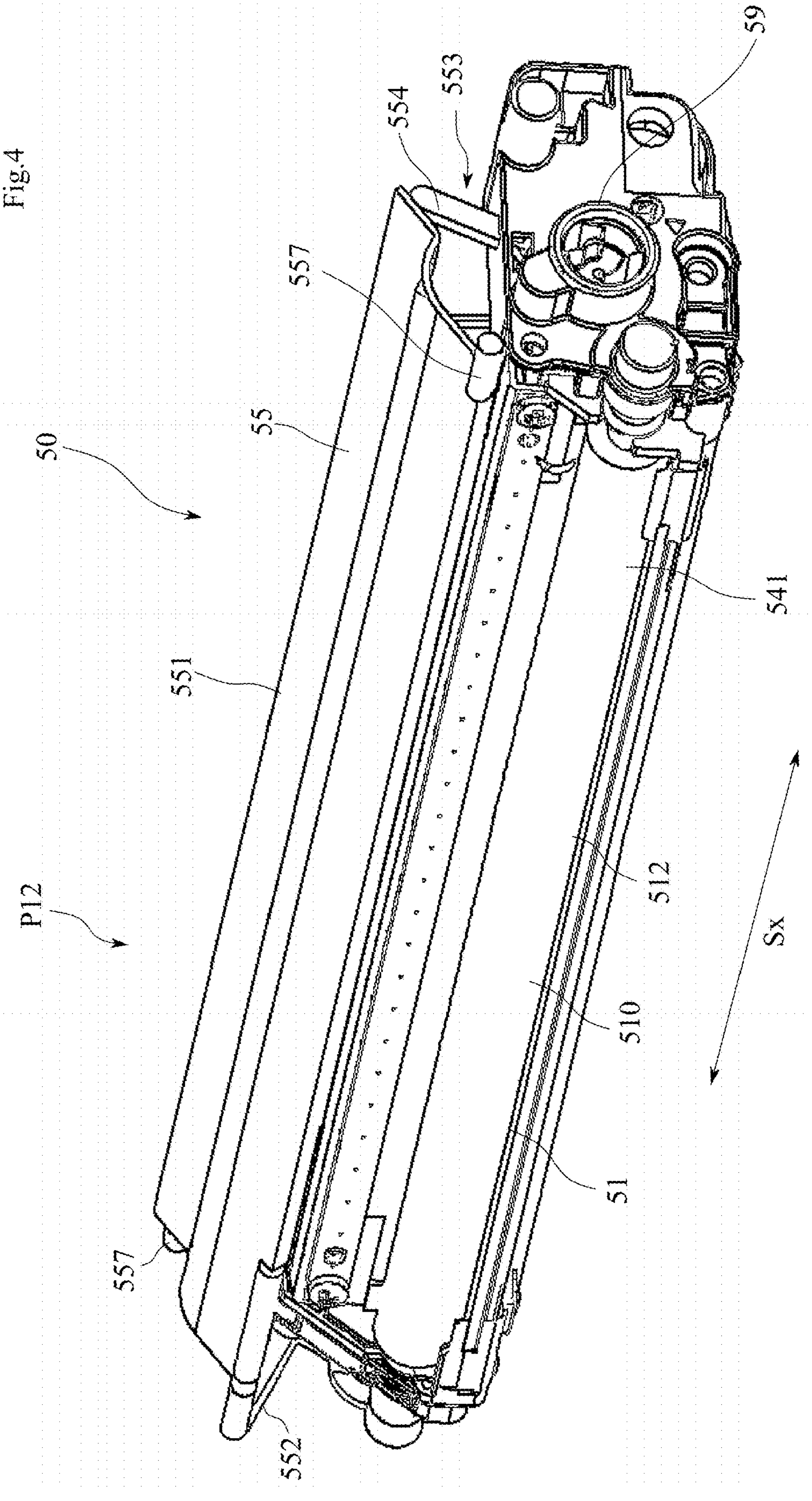
FIG. 4 is a perspective view of the toner cartridge in a state where its outer shutter is opened.
Figure 5:
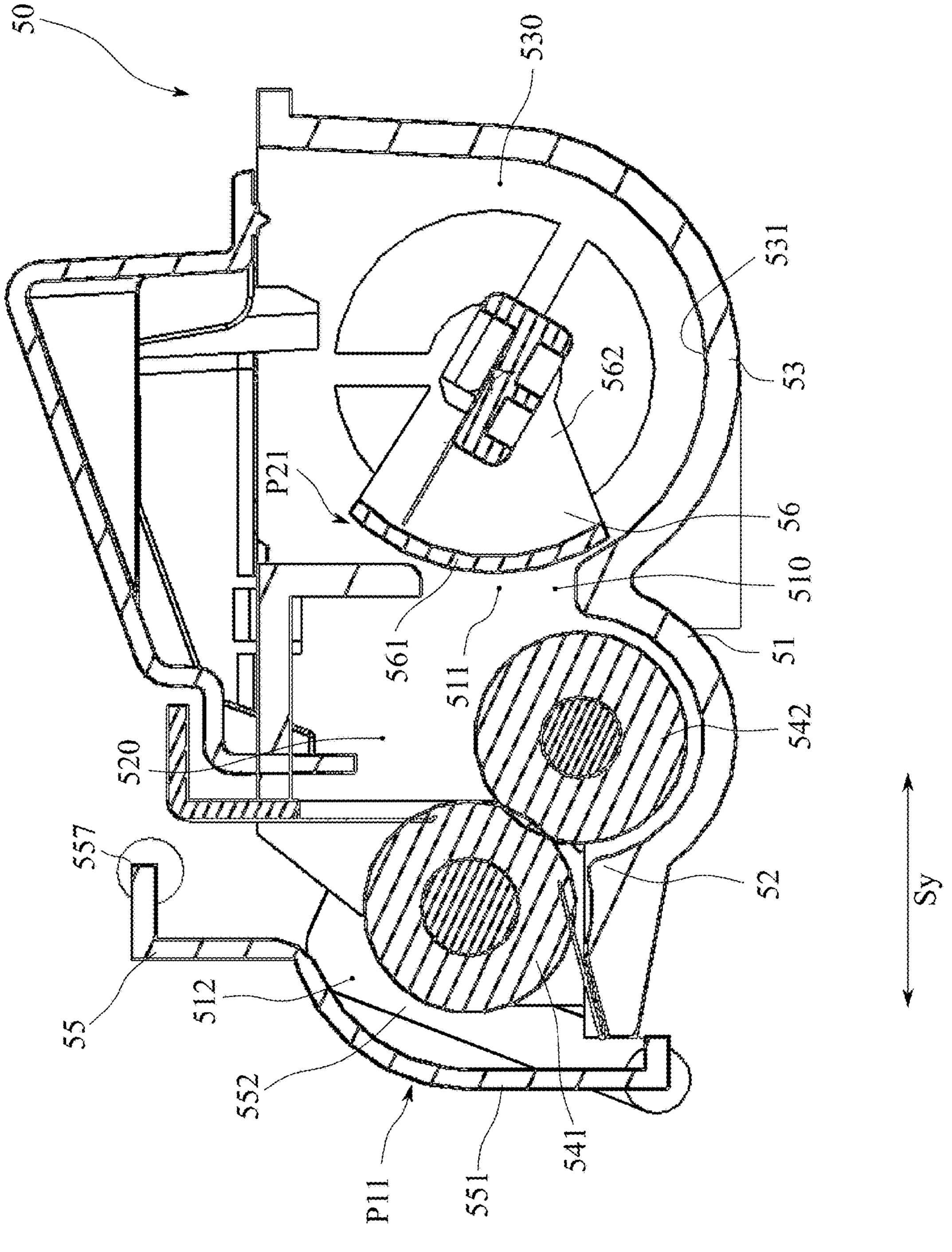
FIG. 5 is a cross-sectional view of the toner cartridge in a state where its outer shutter is closed.
Figure 6:
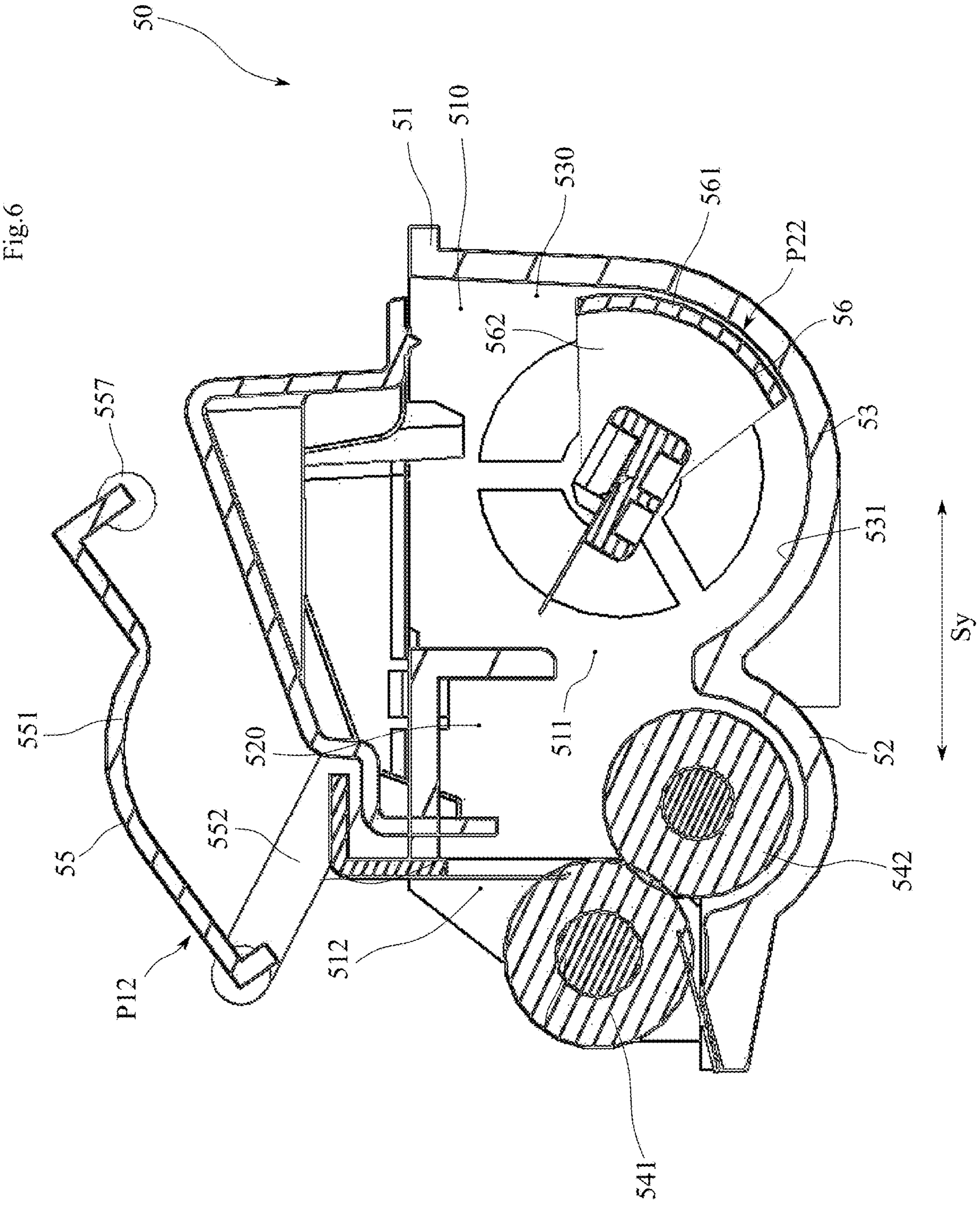
FIG. 6 is a cross-sectional view of the toner cartridge in a state where its outer shutter is opened.
Figure 7:
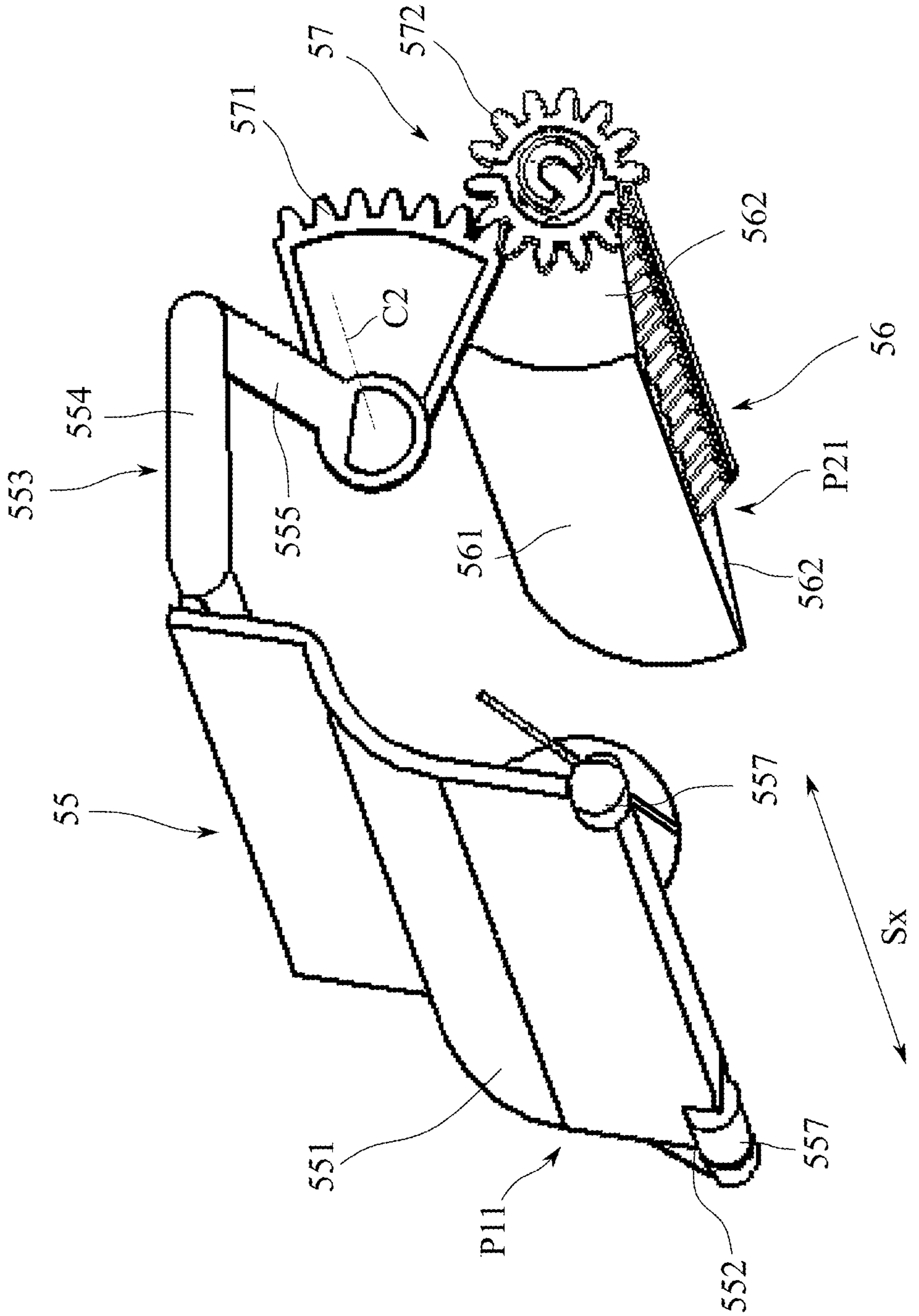
FIG. 7 is a schematic diagram illustrating the outer shutter and an inner shutter in the closed state.
Figure 8:
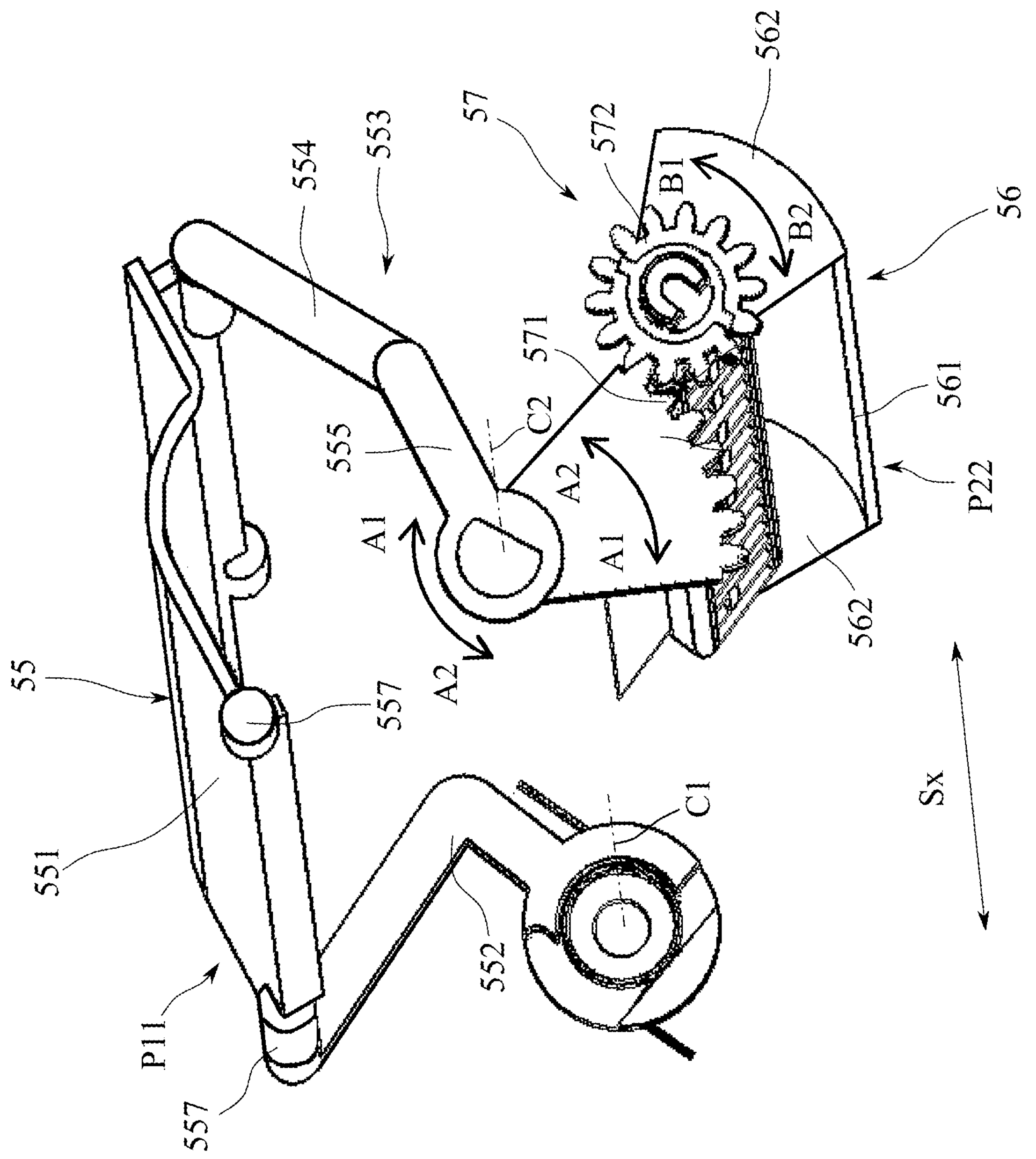
FIG. 8 is a schematic diagram illustrating the outer shutter and the inner shutter in the opened state.

FIG. 3 is a perspective view of the toner cartridge 50 in a state where an outer shutter 55 is closed. FIG. 4 is a perspective view of the toner cartridge 50 in a state where the outer shutter 55 is opened. FIG. 5 is a cross-sectional view of the toner cartridge 50 in the state where the outer shutter 55 is closed. FIG. 6 is a cross-sectional view of the toner cartridge 50 in the state where the outer shutter 55 is opened. FIG. 7 is a schematic diagram of the outer shutter 55 and an inner shutter 56 in the closed state. FIG. 8 is a schematic diagram of the outer shutter 55 and the inner shutter 56 in the opened state.

The toner cartridge 50 is one example of a storage container that stores toner. The toner cartridge 50 illustrated in FIG. 3 includes a container main body 51, a development unit 52, a toner storage section 53, a developing roller 541, a feed roller 542, the outer shutter 55, the inner shutter 56, a gear mechanism 57, a torsion spring 58, and a drive unit 59.

The container main body 51 is a box body having an inside space 510. The container main body 51 has an elongated shape extending in the scanning direction Sx. The container main body 51 includes the development unit 52 and the toner storage section 53. The development unit 52 and the toner storage section 53 are arranged side by side in the sub-scanning direction Sy. Further, the container main body 51 has a connection hole 511 that allows an internal space 520 of the development unit 52 and an internal space 530 of the toner storage section 53 to communicate to each other.

The toner storage section 53 stores toner in its internal space 530. The internal space 530 of the toner storage section 53 is a cylindrical space extending in the scanning direction Sx. An inner periphery surface 531 of the toner storage section 53 has a cylindrical shape having a center axis extending in the scanning direction Sx. In the internal space 530 of the toner storage section 53, the inner shutter 56 is disposed movably along the inner periphery surface 531.

In the internal space 520 of the development unit 52, the developing roller 541 and the feed roller 542 are disposed in a rotatable manner. The internal space 520 of the development unit 52 is supplied with toner stored in the internal space 530 of the toner storage section 53, via the connection hole 511. The feed roller 542 rotates and supplies the toner to the developing roller 541. The drive unit 59 is disposed at one side end part of the container main body 51 in the scanning direction Sx. The drive unit 59 drives the developing roller 541 and the feed roller 542 to rotate. The drive unit 59 is a power transmission mechanism that transmits a power from a not shown power source such as a motor to the developing roller 541 and the feed roller 542. Note that a structure may be adopted in which the drive unit 59 is disposed on each side in the scanning direction.

The development unit 52 has an external opening 512 that communicates the internal space 520 with the outside. When the toner cartridge 50 is attached to the development unit 14, the developing roller 541 faces the photosensitive drum 11 with a certain interval between them, via the external opening 512. As the toner, a magnetic one-component toner is used, for example. The developing roller 541 has a structure that can generate magnetic force, and the toner is attracted and adheres to the surface of the developing roller 541.

The toner is charged in the developing roller 541. The charged toner adheres to the surface of the developing roller 541. The developing roller 541 is electrically connected a voltage application unit (not shown), and is applied with a developing bias from the voltage application unit so that the toner is separated from the developing roller 541. The toner separated from the developing roller 541 by application of the developing bias is absorbed by the electrostatic latent image on the photosensitive drum 11. In this way, the toner image is formed on the surface of the photosensitive drum 11.

The outer shutter 55 is attached to the container main body 51 so as to open and close the external opening 512. As illustrated in FIGS. 7 and 8, the outer shutter 55 includes a door section 551, a support leg section 552, and a link mechanism 553. The door section 551 is a member extending in the scanning direction Sx, and is disposed movably between a first closing position P11 to close the external opening 512 by covering outside of the external opening 512, and a first opening position P12 to open the external opening 512 by shifting from the external opening 512.

The support leg section 552 supports an end part of the outer shutter 55 on the side of the first closing position P11 of an end part on the opposite side of the drive unit 59 in the scanning direction Sx, in a rotatable manner about a center axis C1 along the scanning direction Sx. In addition, a part of the support leg section 552 apart from the part supporting the door section 551 is supported by the development unit 52 in a rotatable manner.

The link mechanism 553 includes a first arm 554 and a second arm 555. The first arm 554 and the second arm 555 can rotate with respect to each other. The first arm 554 is attached to an end part of the door section 551 on the side of the first opening position P12 of an end part on the side of the drive unit 59 in the scanning direction Sx, in a rotatable manner about the center axis along the scanning direction Sx. A first gear section 571 of the gear mechanism 57, which will be described later, is attached to a side of the second arm 555 opposite to the part connecting to the first arm 554.

The second arm 555 and the first gear section 571 are supported in a rotatable manner about a center axis C2 extending in the scanning direction Sx. The first gear section 571 is engaged with a second gear section 572 described later that is attached to the inner shutter 56. Note that although the center axis C1 and the center axis C2 are shifted from each other, the outer shutter 55 is substantially rotated about the center axis C1, because one of the support members that support the outer shutter 55 in a rotatable manner is the link mechanism 553.

The outer shutter 55 is disposed outside the development unit 52 in a reciprocatable manner between the first closing position P11 and the first opening position P12, by rotating about a rotation axis parallel to the scanning direction Sx. Note that the outer shutter 55 may also be movable to a position different from the first closing position P11 or the first opening position P12. As to the outer shutter 55, when the support leg section 552 rotates about the center axis C1, the door section 551 moves in the opening direction or in the closing direction. When the door section 551 moves, the first arm 554 and the second arm 555 of the link mechanism 553 works as a link, and the second gear section 572 rotates in the rotation direction.

When the outer shutter 55 is in the first closing position P11, the external opening 512 is closed. In this way, also when moving the toner cartridge 50 for attaching or detaching from the development unit 14, the toner in the internal space 520 of the development unit 52 is prevented from leaking to the outside.

Inside the toner storage section 53, the inner shutter 56 is disposed. The inner shutter 56 includes a door section 561 and a support leg section 562. The door section 561 can move along the inner periphery surface 531 of the toner storage section 53 in the circumferential direction. In other words, the door section 561 has a shape constituting a part in the circumferential direction of a cylinder having the center axis extending in the center axis extending in the scanning direction Sx.

The support leg section 562 is constituted of a pair of parts, which are connected respectively to both ends of the door section 561 in the scanning direction Sx. The support leg section 562 is supported by the toner storage section 53 in a rotatable manner in the circumferential direction about the center axis C1 extending along the scanning direction Sx.

The inner shutter 56 can move between a second closing position P21 for the door section 561 to close the connection hole 511 by covering the inside of the connection hole 511, and a second opening position P22 to open the connection hole 511 by shifting from the connection hole 511. The inner shutter 56 is disposed inside the toner storage section 53 in a reciprocatable manner between the second closing position P21 and the second opening position P22, by rotating about a rotation axis parallel to the scanning direction Sx.

When the door section 561 is in the second closing position P21, the inner shutter 56 can prevent the toner stored in the internal space 530 of the toner storage section 53 from moving to the development unit 52. In this way, when moving the toner cartridge 50, leakage of the toner can be suppressed.

The gear mechanism 57 includes the first gear section 571 and the second gear section 572. The second gear section 572 is attached to the support leg section 562 of the inner shutter 56. Note that in the toner cartridge 50 of this embodiment, the rotation center of the second gear section 572 is the same as the rotation center of the inner shutter 56. When the second gear section 572 rotates, the inner shutter 56 pivots between the second closing position P21 and the second opening position P22.

The first gear section 571 is attached to the second arm 555 of the outer shutter 55. Note that in the toner cartridge 50 of this embodiment, the second arm 555 and the first gear section 571 are integrally formed, but this is not a limitation. As long as the second arm 555 and the first gear section 571 work as one unit, they may be formed as separate bodies and fixed to each other by a fixing method such as adhesion, screw fastening, or the like.

Depending on shapes of the first arm 554, the second arm 555, and the gear mechanism 57, movement amount of the outer shutter 55 and movement amount of the inner shutter 56 can be adjusted. Note that depending on relationship between the movement amount of the outer shutter 55 and the movement amount of the inner shutter 56, the link mechanism constituted of the first arm 554 and the second arm 555 may be eliminated, and the support leg section 552 may be used for supporting the door section 551 in the same manner as the opposite side. In this case, the first gear section 571 is attached to the support leg section 552.

When attaching the toner cartridge 50 to the development unit 14, the door section 551 of the outer shutter 55 moves from the first closing position P11 to the first opening position P12. At this time, the first arm 554 and the second arm 555 also move responding to the movement of the door section 551. The movement of the second arm 555 causes the first gear section 571 to rotate, and the second gear section 572 engaged with the first gear section 571 rotates, so that the inner shutter 56 moves.

In other words, in the toner cartridge 50, when the outer shutter 55 moves between the first closing position P11 and the first opening position P12, in synchronization with the movement, the inner shutter 56 also moves between the second closing position P21 and the second opening position P22. When the outer shutter 55 is in the first closing position P11, the inner shutter 56 is in the second closing position P21. In this way, the toner stored in the internal space 530 of the toner storage section 53 hardly moves to the internal space 520 of the development unit 52. Further, the toner remaining in the internal space 520 of the development unit 52 hardly leaks to the outside. In this way, the effect of suppressing leakage of the toner from the toner cartridge 50 to the outside can be enhanced.

In addition, when the outer shutter 55 is in the first opening position P12, the inner shutter 56 is in the second opening position P22. In this way, the toner stored in the internal space 530 of the toner storage section 53 can easily move to the internal space 520 of the development unit 52. The toner moved from the internal space 530 by the feed roller 542 can be smoothly supplied to the developing roller 541, and hence accurate image formation can be performed.

Figure 9:
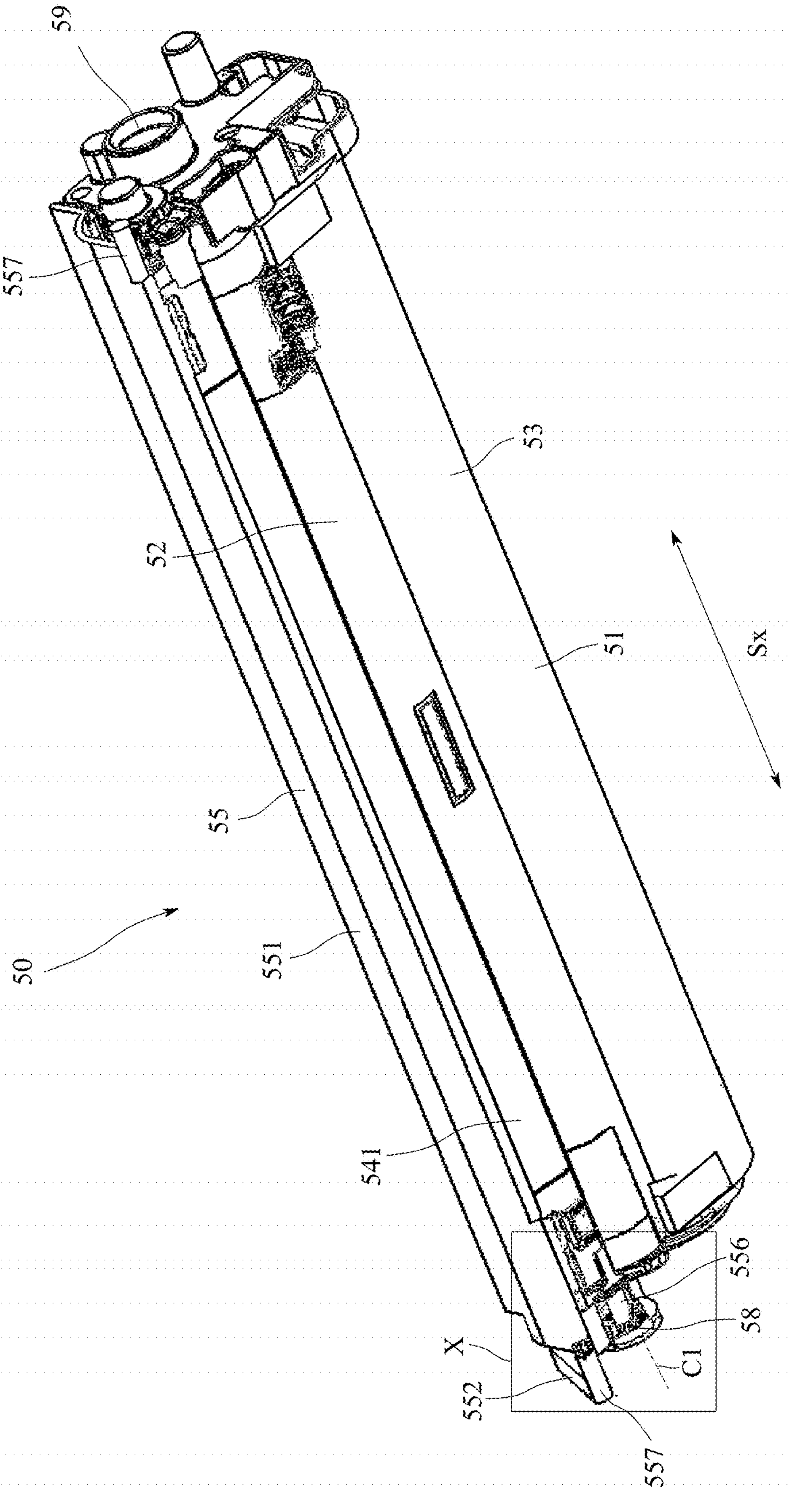
FIG. 9 is a perspective view of the toner cartridge viewed from below.
Figure 10:
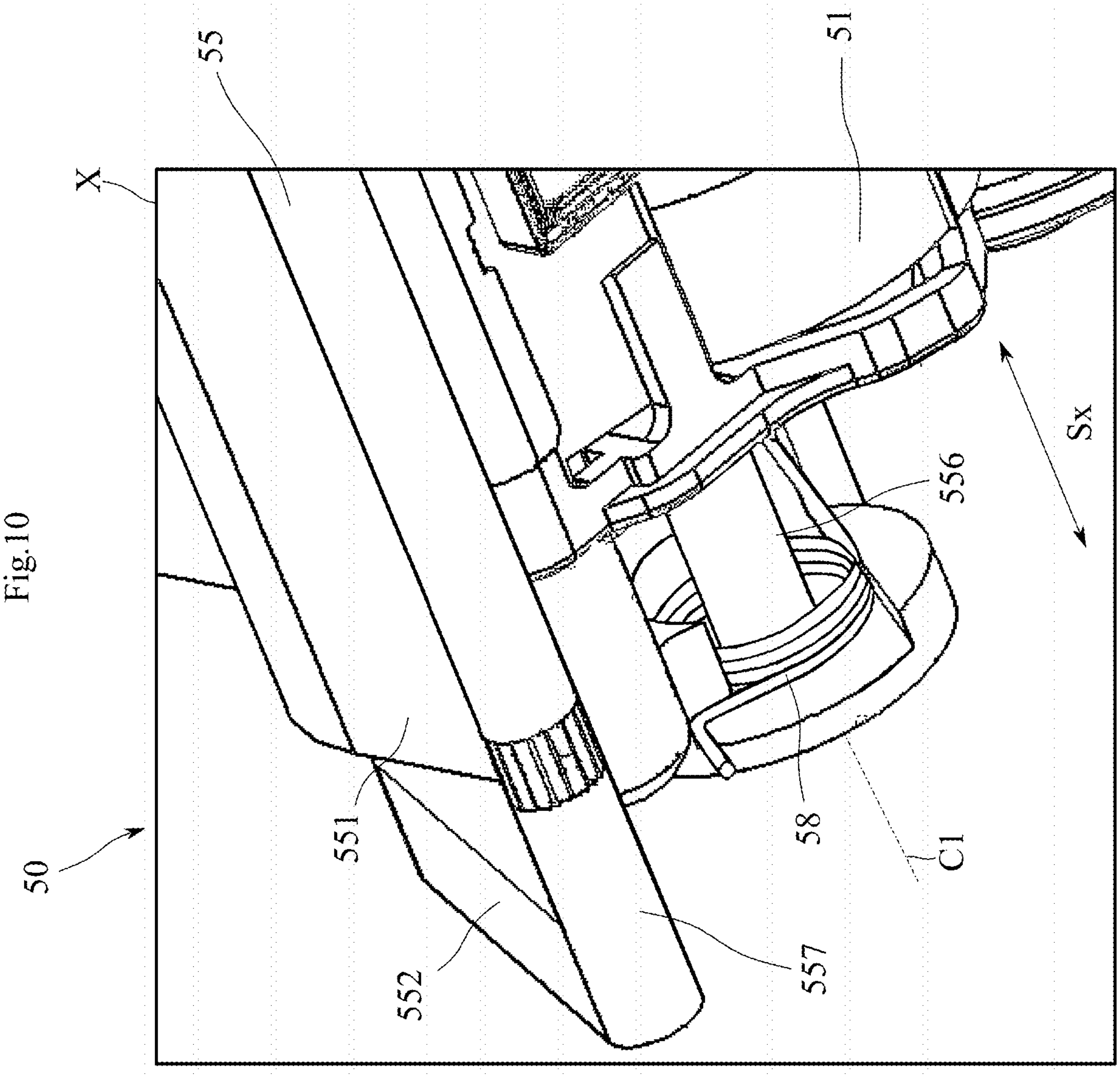
FIG. 10 is an enlarged perspective view of X-part enclosed in a rectangle in FIG. 9.

FIG. 9 is a perspective view of the toner cartridge 50 viewed from below. FIG. 10 is an enlarged perspective view of X-part enclosed in a rectangle in FIG. 9. As illustrated in FIGS. 9 and 10, the support leg section 552 of the outer shutter 55 is provided with a cylindrical rotation shaft 556 extending along the scanning direction Sx. As the rotation shaft 556 is supported by the container main body 51 in a rotatable manner, the outer shutter 55 is supported in a rotatable manner. Further, the torsion spring 58 is attached to the rotation shaft 556.

The torsion spring 58 applies the outer shutter 55 with a force in the direction of rotation about the rotation shaft 556. More specifically, the force given by the torsion spring 58 is applied in a direction for the outer shutter 55 to move to the first closing position P11. In other words, the outer shutter 55 is applied with the force in the direction of motion to the first closing position P11 by the torsion spring 58. If no other force is applied to the outer shutter 55, the outer shutter 55 is moved to the first closing position P11 by the force of the torsion spring 58 and stops in the first closing position P11.

Note that when the outer shutter 55 is in the first closing position P11, the torsion spring 58 may apply or may not apply force to the outer shutter 55. When the outer shutter 55 is in the first closing position P11, by applying force to the outer shutter 55, the outer shutter 55 can be pressed at the first closing position P11, and hence rattling or the like hardly occurs, so that the effect of suppressing leakage of the toner can be enhanced.

(Attaching and Detaching of Toner Cartridge 50)

Figure 11:
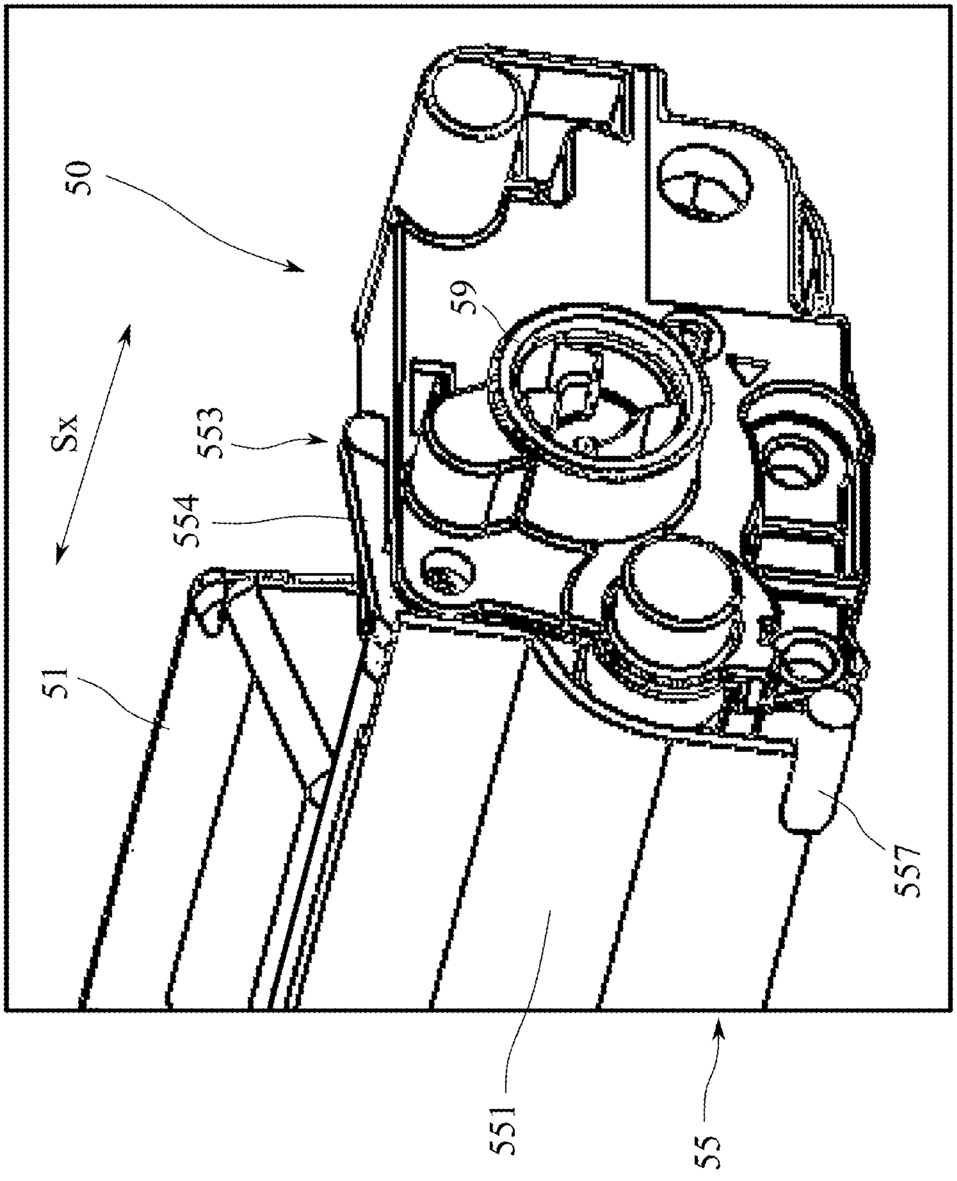
FIG. 11 is an enlarged perspective view of an opening and closing boss and its vicinity in the state where the outer shutter is closed.

The toner cartridge 50 is configured to be attachable and detachable from the drum cartridge 111. FIG. 11 is an enlarged perspective view of an opening and closing boss 557 and its vicinity in the state where the outer shutter 55 is closed. FIG. 12 is a perspective view illustrating the toner cartridge 50 in a state attached to the drum cartridge 111. FIG. 13 is an enlarged perspective view of the opening and closing boss 557 and its vicinity of the outer shutter 55 of the toner cartridge 50 attached to the drum cartridge 111.

The drum cartridge 111 houses the photosensitive drum 11 inside a drum frame 112. The drum frame 112 has support sections 113 on its both ends in the scanning direction Sx, so as to support the photosensitive drum 11 in a rotatable manner. Further, the drum frame 112 has an insertion hole 114 for inserting the toner cartridge 50.

The outer shutter 55 of the toner cartridge 50 has the opening and closing boss 557. In other words, a pair of the opening and closing bosses 557 are provided to the outer shutter 55. The pair of opening and closing bosses 557 extend from both ends of the outer shutter 55 in the scanning direction Sx in the opposite directions along the scanning direction Sx.

The opening and closing boss 557 protrudes to the outside of the toner cartridge 50 in the scanning direction. Therefore, when inserting the toner cartridge 50 in the drum cartridge 111, the opening and closing boss 557 contacts the drum frame 112 of the drum cartridge 111 and is pushed by the drum frame 112. In this way, the outer shutter 55 of the toner cartridge 50 moves from the first closing position P11 to the first opening position P12 (in arrow A1 direction in FIG. 8).

In this way, the first arm 554 and the second arm 555 of the link mechanism 553 move in a synchronous manner. When the second arm 555 moves, the first gear section 571 of the gear mechanism 57 pivots (in the arrow A1 direction in FIG. 8), and the second gear section 572 engaged with the first gear section 571 pivots (in arrow B1 direction in FIG. 8). When the second gear section 572 pivots, the inner shutter 56 also pivots (in the arrow B1 direction in FIG. 8).

As illustrated in FIG. 12, when the toner cartridge 50 is attached to the drum cartridge 111 at an attachment position, the opening and closing boss 557 is supported by the drum frame 112. In this way, the outer shutter 55 is maintained at the first opening position P12. In addition, the inner shutter 56 is maintained at the second opening position P22. The external opening 512 of the toner cartridge 50 becomes opened, and the photosensitive drum 11 and the developing roller 541 are disposed to face each other with a certain gap between them. In addition, the connection hole 511 is also opened, and hence toner can be supplied from the toner storage section 53 to the development unit 52. In this way, an accurate toner image can be formed stably on the surface of the photosensitive drum 11.

When detaching the toner cartridge 50 from the drum cartridge 111, the outer shutter 55 is pushed by the torsion spring 58 from the first opening position P12 toward the first closing position P11. In this way, although the opening and closing boss 557 is supported by the drum frame 112, the toner cartridge 50 moves, and hence the position of the outer shutter 55 with respect to the container main body 51 changes. In other words, in the toner cartridge 50, the outer shutter 55 moves from the first opening position P12 toward the first closing position P11 (in arrow A2 direction in FIG. 8).

In this way, the first arm 554 and the second arm 555 of the link mechanism 553 move in a synchronous manner. When the second arm 555 moves, the first gear section 571 of the gear mechanism 57 pivots (in the arrow A2 direction in FIG. 8), and the second gear section 572 engaged with the first gear section 571 pivots (in arrow B2 direction in FIG. 8). When the second gear section 572 pivots, the inner shutter 56 also pivots (in the arrow B2 direction in FIG. 8).

Further, when the toner cartridge 50 is detached from the drum cartridge 111, the outer shutter 55 moves to the first closing position P11. In this way, the inner shutter 56 moves to the second closing position P21. Thus, movement of toner from the toner storage section 53 to the development unit 52 is suppressed, and leakage of toner through the external opening 512 is suppressed. In this way, when the toner cartridge 50 is detached, leakage of toner to the outside is suppressed.

In addition, the above embodiment describes an example in which the image forming apparatus is a printer that records an monochrome image using black ink, but for example, the toner cartridge 50 of this embodiment can be used also in a case where a color printer is used, which records a color image using four color inks.

The present disclosure can be applied to a toner cartridge that is mounted to an image forming apparatus such as a laser printer, in an attachable and detachable manner.

What is claimed is:

1. A toner cartridge configured to supply toner to an electrostatic latent image formed on an image carrier, so as to develop the same into a toner image, the toner cartridge comprising:

a toner container configured to store the toner;

a development unit connected to the toner container via a connection hole, the development unit having an external opening on its outer periphery surface so as to supply the toner to the image carrier;

a toner carrier disposed in the development unit in a rotatable manner, so as to face the image carrier, the toner carrier carrying the toner;

an outer shutter configured to open and close the external opening;

an inner shutter configured to open and close the connection hole; and a gear mechanism configured to connect the outer shutter and the inner shutter to be capable of interlocking with each other, wherein the outer shutter is movable at least between a first closing position to close the external opening and a first opening position to open the external opening, the inner shutter is movable at least between a second closing position to close the connection hole and a second opening position to open the connection hole, and when the outer shutter is in the first closing position, the inner shutter is in the second closing position, while when the outer shutter is in the first opening position, the inner shutter is in the second opening position.

2. The toner cartridge according to claim 1, further comprising a biasing member configured to bias the outer shutter toward the first closing position.

3. An image forming apparatus comprising:

an image carrier having a surface on which an electrostatic latent image is formed; and the toner cartridge according to claim 2, configured to supply toner to the electrostatic latent image formed on the image carrier, so as to develop a toner image.

4. The image forming apparatus according to claim 3, comprising an image carrier holding section configured to hold the image carrier in a rotatable manner, wherein the outer shutter has an opening and closing boss configured to contact the image carrier holding section so as to move the outer shutter to the first opening position.

5. The toner cartridge according to claim 1, wherein the outer shutter and the gear mechanism are connected to each other via a link mechanism.

6. An image forming apparatus comprising:

an image carrier having a surface on which an electrostatic latent image is formed; and the toner cartridge according to claim 5, configured to supply toner to an electrostatic latent image formed on the image carrier, so as to develop a toner image.

7. The image forming apparatus according to claim 6, comprising an image carrier holding section configured to hold the image carrier in a rotatable manner, wherein the outer shutter has an opening and closing boss configured to contact the image carrier holding section so as to move the outer shutter to the first opening position.

8. An image forming apparatus comprising:

an image carrier having a surface on which an electrostatic latent image is formed; and the toner cartridge according to claim 1, configured to supply toner to the electrostatic latent image formed on the image carrier, so as to develop a toner image.

9. The image forming apparatus according to claim 8, comprising an image carrier holding section configured to hold the image carrier in a rotatable manner, wherein the outer shutter has an opening and closing boss configured to contact the image carrier holding section so as to move the outer shutter to the first opening position.

* * * * *